United States Patent
Ishida et al.

(10) Patent No.: US 10,328,854 B2
(45) Date of Patent: Jun. 25, 2019

(54) HYBRID VEHICLE HAVING NOTIFICATION MECHANISM

(71) Applicant: TOYOTA JIDOSHA KABUSHIKI KAISHA, Toyota-shi, Aichi-ken (JP)

(72) Inventors: Ryuta Ishida, Okazaki (JP); Hiroaki Takeuchi, Toyota (JP); Hiroaki Arakawa, Nagakute (JP); Shinji Ichikawa, Toyota (JP); Keita Hashimoto, Toyota (JP); Shigeki Kinomura, Toyota (JP); Akio Uotani, Toyota (JP); Kazuyuki Kagawa, Toyota (JP); Yusuke Kinoshita, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/469,688

(22) Filed: Mar. 27, 2017

(65) Prior Publication Data

US 2017/0282793 A1 Oct. 5, 2017

(30) Foreign Application Priority Data

Mar. 30, 2016 (JP) .................. 2016-069248

(51) Int. Cl.
*G02B 21/00* (2006.01)
*B60Q 9/00* (2006.01)
(Continued)

(52) U.S. Cl.
CPC .............. *B60Q 9/00* (2013.01); *B60K 6/20* (2013.01); *B60W 40/09* (2013.01); *B60K 6/445* (2013.01);
(Continued)

(58) Field of Classification Search
CPC ....................................................... B60Q 9/00
(Continued)

(56) References Cited

U.S. PATENT DOCUMENTS 8,725,551 B2  5/2014  Ambrosio et al.
8,812,224 B1  8/2014  Heitmann
(Continued)

FOREIGN PATENT DOCUMENTS

DE   10 2011 122 182 A1   6/2012
DE      2011 122 152 A1   6/2012
(Continued)

OTHER PUBLICATIONS

Office Action issued in U.S. Appl. No. 15/465,831 dated May 4, 2018.
(Continued)

*Primary Examiner* — Omeed Alizada
(74) *Attorney, Agent, or Firm* — Finnegan, Henderson, Farabow, Garrett & Dunner, LLP (57) ABSTRACT

A hybrid vehicle includes an engine, a fuel tank, a motor, a battery, a charger, and a notification mechanism. The battery is configured to supply electric power to the motor. The charger is configured to carry out external charging that charges the battery by use of electric power from an external power source. The notification mechanism is configured to notify, to an outside of the vehicle, information on a use index indicative of a degree of use of external charging in a predetermined time period.

10 Claims, 9 Drawing Sheets

(51) Int. Cl.
  *B60K 6/20* (2007.10)
  *B60W 40/09* (2012.01)
  *B60K 6/445* (2007.10)
  *B60L 11/18* (2006.01)
  *B60Q 1/50* (2006.01)
  *B60Q 1/26* (2006.01)

(52) U.S. Cl.
  CPC .......................... *B60K 2350/2008* (2013.01); *B60K 2350/924* (2013.01); *B60L 11/1816* (2013.01); *B60Q 1/26* (2013.01); *B60Q 1/50* (2013.01); *B60Q 2400/20* (2013.01); *B60Q 2500/00* (2013.01); *Y02T 10/6239* (2013.01); *Y02T 10/6269* (2013.01); *Y10S 903/904* (2013.01)

(58) Field of Classification Search
  USPC ....................... 340/455, 636.1, 438, 463, 468
  See application file for complete search history.

(56) References Cited

U.S. PATENT DOCUMENTS

| | | | |
|---|---|---|---|
| 2009/0144149 | A1 | 6/2009 | Sakakibara et al. |
| 2009/0242288 | A1 | 10/2009 | Oyobe et al. |
| 2010/0168944 | A1 | 7/2010 | Otake |
| 2010/0217468 | A1 | 8/2010 | Soma et al. |
| 2010/0280692 | A1 | 11/2010 | Eckhoff et al. |
| 2010/0280885 | A1 | 11/2010 | Eckhoff et al. |
| 2011/0043355 | A1* | 2/2011 | Chander ............ B60L 11/1818 340/455 |
| 2012/0007553 | A1* | 1/2012 | Ichikawa et al. ... B60L 11/1816 320/109 |
| 2012/0242466 | A1 | 9/2012 | Stillfried et al. |
| 2012/0280804 | A1* | 11/2012 | Matsumoto ......... B60L 11/1816 340/425.5 |
| 2017/0287234 | A1 | 10/2017 | Hashimoto et al. |

FOREIGN PATENT DOCUMENTS

| | | |
|---|---|---|
| JP | 8-19114 | 1/1996 |
| JP | 2007-068358 A | 3/2007 |
| JP | 2009-023563 A | 2/2009 |
| JP | 2009-134450 A | 6/2009 |
| JP | 2009-214668 A | 9/2009 |

OTHER PUBLICATIONS

U.S. Appl. No. 15/961,593 filed Apr. 24, 2018.
Office Action issued in U.S. Appl. No. 15/961,593 dated Jun. 1, 2018.
Final Office Action issued in U.S. Appl. No. 15/465,831 dated Sep. 26, 2018.
Final Office Action issued in U.S. Appl. No. 15/961,593 dated Oct. 19, 2018.
Notice of Allowance issued in U.S. Appl. No. 15/465,831 dated Jan. 22, 2019.
Notice of Allowance issued in U.S. Appl. No. 15/961,593 dated Feb. 21, 2019.

\* cited by examiner

HYBRID VEHICLE HAVING NOTIFICATION MECHANISM

INCORPORATION BY REFERENCE

The disclosure of Japanese Patent Application No. 2016-069248 filed on Mar. 30, 2016 including the specification, drawings and abstract is incorporated herein by reference in its entirety.

BACKGROUND

1. Technical Field

The disclosure relates to a hybrid vehicle, and more particularly, to a hybrid vehicle configured such that charging of a battery by a charger and refueling to a fuel tank are carried out.

2. Description of Related Art

Japanese Patent Application Publication No. 8-19114 (JP 8-19114 A) discloses a hybrid vehicle in which at least one of the output of an electric motor and the output of an internal combustion engine is limited when the change in parameter that depends on the quantity of fuel use by the internal combustion engine after external charging of a battery has reached a predetermined value. With this hybrid vehicle, a driver is urged to carry out external charging of the battery by the limitation of at least one of the output of the electric motor and the output of the internal combustion engine when the change in parameter has reached the predetermined value, thereby facilitating the travel of the vehicle not relying on the internal combustion engine. Consequently, the effect of suppressing air pollution can be sufficiently obtained as an electric vehicle while leaving a margin such that the vehicle can travel by the internal combustion engine in an emergency.

SUMMARY

With the hybrid vehicle described above, however, only by limiting at least one of the output of the electric motor and the output of the internal combustion engine, there are those instances where the effect of urging the use of external charging is insufficient. For example, for a driver who always drives the vehicle to travel with relatively low power, the effect of the output limitation of the electric motor or the internal combustion engine is small.

The disclosure provides a hybrid vehicle that can promote use of external charging.

An aspect of the disclosure relates to a hybrid vehicle. The hybrid vehicle includes an engine, a fuel tank, a motor, a battery, a charger, and a notification mechanism. The fuel tank stores fuel to be supplied to the engine. The battery is configured to supply electric power to the motor. The charger is configured to carry out external charging that charges the battery by use of electric power from an external power source. The notification mechanism is configured to notify information on a use index to an outside of the vehicle. The use index is an index for indicating a degree of use of external charging in a predetermined time period.

According to the above configuration, the hybrid vehicle notifies, to the outside of the vehicle, the information on the use index indicative of the degree of use of external charging in the predetermined time period. Hereby, it is possible to recognize the information on the use index from the outside of the vehicle. As a result, by the recognition from the outside of the vehicle (recognition by people outside the vehicle, a vehicle external system, or the like), a preferential treatment can be easily performed on the vehicle or a penalty can be easily imposed on the vehicle. This makes it possible to urge a user to use the external charging, thereby making it possible to promote the use of external charging. This makes it possible to achieve a reduction in environment load.

Here, as the "predetermined time period," it is possible to use a predetermined time period set in advance in terms of time, such as one month or two months, a period determined in advance in terms of occasion, such as a period during 20 trips or a period during 30 trips, or the like.

The "use index" indicates a degree of use of external charging in a predetermined time period, and the present specification uses an index indicative of such a relationship that, the greater the use index, the better the use of external charging.

As the preferential treatment and the penalty, there can be cited permission of use of a priority lane or a special-purpose lane on a road including a plurality of lanes, setting of a high toll or a low toll in a toll road, permission of entry to a parking lot or the like, permission of use of a priority parking space or a special-purpose parking space in a parking lot, setting of a high external-charging fee or a low external-charging fee at a battery charging station, and the like.

In the hybrid vehicle, the notification mechanism may be configured to perform notification of the information on the use index by performing at least one of change of color of a part of the hybrid vehicle according to the use index, display of the use index on a part of the hybrid vehicle, display of a message corresponding to the use index on a part of the hybrid vehicle, and change of shape of a part of the hybrid vehicle according to the use index. According to the above configuration, it is possible to recognize the information on the use index from the outside of the vehicle by the change of color, the display of the use index or the message, or the change of shape.

In the hybrid vehicle, when the notification mechanism performs the notification of the information on the use index by performing the change of color of the part of the hybrid vehicle according to the use index, the notification mechanism may be configured perform the notification by performing at least one of change of color of a head lamp, change of color of a back lamp, change of color of a stop lamp, change of color of a turn signal lamp, change of color of an outer rear view mirror assembly, change of color of an exterior door handle assembly, change of color of a letter of a number plate, change of color of a number frame, change of color of an emblem, change of color of a lid, change of color of a back door garnish assembly, and change of color of a letter of a back door name plate. According to the above configuration, it is possible to recognize the information on the use index from the outside of the vehicle by the change of color of each part of the vehicle.

In the hybrid vehicle, when the notification mechanism performs the notification of the information on the use index by performing the display of the use index on the part of the hybrid vehicle and the display of the message corresponding to the use index on the part of the hybrid vehicle, the notification mechanism may be configured to perform the notification by performing at least one of display on the number plate, display on the number frame, display on a vehicle body, display on a bonnet, and display on a door. According to the above configuration, it is possible to recognize the information on the use index from the outside of the vehicle by the display of the use index or the message on each part of the vehicle.

In the hybrid vehicle, when the notification mechanism performs the notification of the information on the use index by performing at least one of the display of the use index on the part of the hybrid vehicle and the display of the message corresponding to the use index on the part of the hybrid vehicle, the notification mechanism may be configured to perform the notification by performing at least one of display on a number plate, display on a number frame, display on a vehicle body, display on a bonnet, and display on a door. According to the above configuration, it is possible to recognize the information on the use index from the outside of the vehicle by the display of the use index or the message on each part of the vehicle.

In the hybrid vehicle, when the notification mechanism performs the notification of the information on the use index by performing the change of shape of the part of the hybrid vehicle according to the use index, the notification mechanism may be configured to perform the notification by performing change of a length of a projecting portion of an antenna from the vehicle body. According to the above configuration, it is possible to recognize the information on the use index from the outside of the vehicle by the change of the length of the projecting portion of the antenna from the vehicle body.

In the hybrid vehicle, the notification mechanism may be configured to notify the information on the use index to an inside of the vehicle as well as the outside of the vehicle. According to the above configuration, it is possible not only to recognize, from the outside of the vehicle, the information on the use index, but also for a driver and other passengers to recognize it.

In the hybrid vehicle, the notification mechanism may be configured to notify the information on the use index when the use index is less than a threshold.

In the hybrid vehicle, when the notification mechanism notifies the information on the use index to the inside of the vehicle, the notification mechanism may be configured to perform at least one of change of color of a steering wheel, change of color of the emblem or a switch provided in the steering wheel, change of color of an instrument panel, display of the use index on a combination meter, and display of the use index on a display of a navigation device.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, modes for carrying out the disclosure will be described with reference to embodiments.

Figure 1:
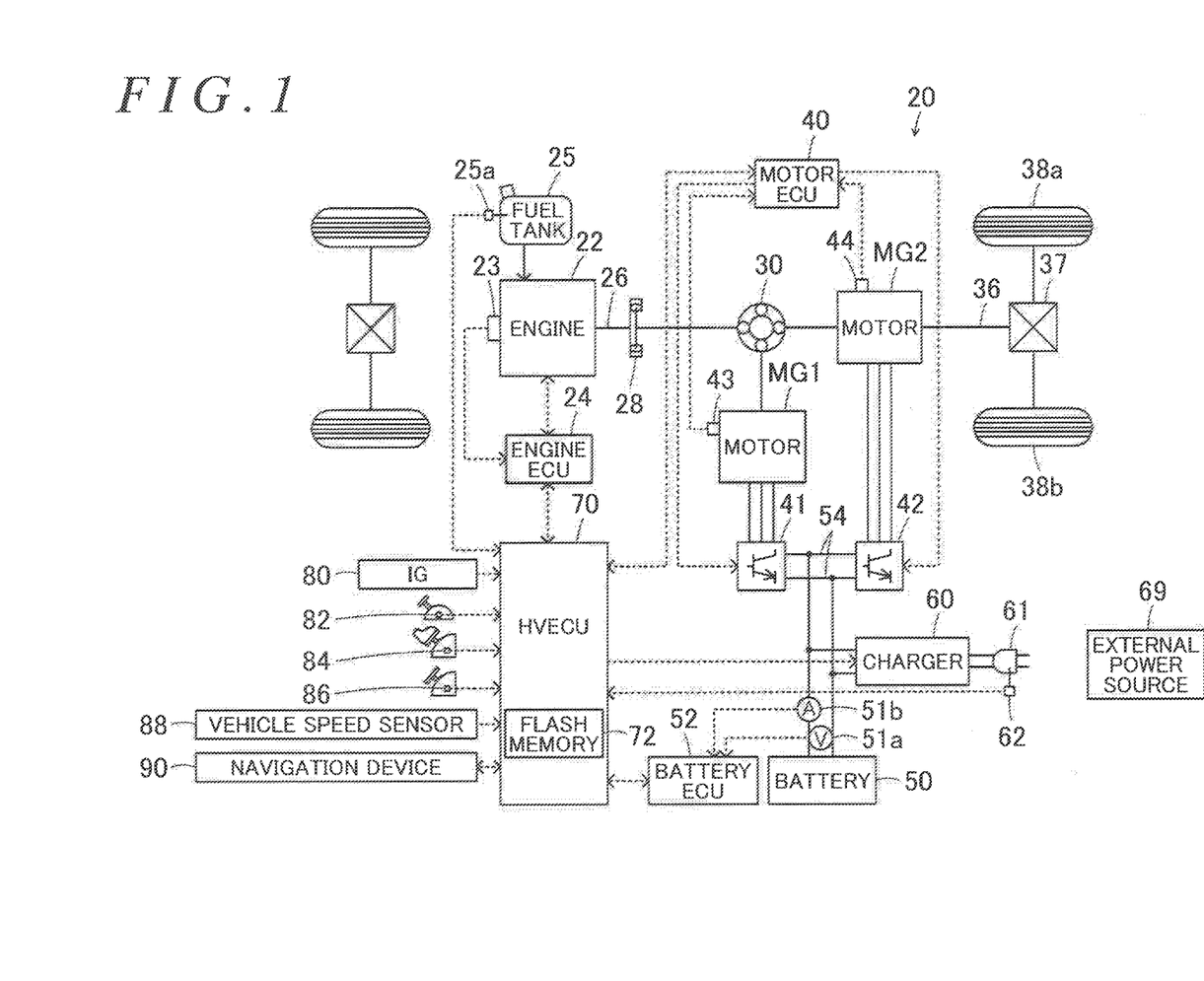
FIG. 1 is a configuration diagram schematically illustrating a configuration of a hybrid vehicle according to an embodiment.

FIG. 1 is a configuration diagram schematically illustrating a configuration of a hybrid vehicle 20 according to an embodiment of the present disclosure. As illustrated herein, the hybrid vehicle 20 of the embodiment includes an engine 22, a planetary gear 30, motors MG1 and MG2, inverters 41 and 42, a battery 50, a charger 60, a navigation device 90, and a hybrid electronic control unit (hereinafter referred to as an "HVECU") 70.

The engine 22 is configured as an internal combustion engine that uses fuel such as gasoline or diesel fuel from a fuel tank 25 to output power. The operation of the engine 22 is controlled by an engine electronic control unit (hereinafter referred to as an "engine ECU") 24.

Although not shown, the engine ECU 24 is configured as a microprocessor including a CPU as its main component and, in addition to the CPU, includes a ROM that stores processing programs, a RAM that temporarily stores data, input and output ports, and a communication port. Signals from various sensors that are necessary for controlling the operation of the engine 22, such as, for example, a crank angle θcr from a crank position sensor 23 that detects a rotational position of a crankshaft 26 of the engine 22, are input to the engine ECU 24 via the input port. Various control signals for controlling the operation of the engine 22 are output from the engine ECU 24 via the output port. The engine ECU 24 is connected to the HVECU 70 via the communication port. The engine ECU 24 calculates a rotational speed Ne of the engine 22 based on the crank angle θcr from the crank position sensor 23.

The planetary gear 30 is configured as a single-pinion type planetary gear mechanism. A rotor of the motor MG1 is connected to a sun gear of the planetary gear 30. A drive shaft 36 coupled to drive wheels 38a and 38b via a differential gear 37 is connected to a ring gear of the planetary gear 30. The crankshaft 26 of the engine 22 is connected to a carrier of the planetary gear 30 via a damper 28.

The motor MG1 is configured as, for example, a synchronous generator motor, and as described above, the rotor of the motor MG1 is connected to the sun gear of the planetary gear 30. The motor MG2 is configured as, for example, a synchronous generator motor, and a rotor of the motor MG2 is connected to the drive shaft 36. The inverters 41, 42 are connected to the battery 50 via electric power line 54. The motors MG1, MG2 are rotationally driven by the inverters 41, 42, respectively, when a plurality of switching elements (not shown) of the inverters 41, 42 are switching-controlled by a motor electronic control unit (hereinafter referred to as a "motor ECU") 40.

Although not shown, the motor ECU 40 is configured as a microprocessor including a CPU as its main component and, in addition to the CPU, includes a ROM that stores processing programs, a RAM that temporarily stores data, input and output ports, and a communication port. Signals from various sensors that are necessary for drivingly controlling the motors MG1, MG2, such as, for example, rotational positions $\theta m1$, $\theta m2$ from rotational position detection sensors 43, 44 that respectively detect rotational positions of the rotors of the motors MG1, MG2, are input to the motor ECU 40 via the input port. Switching control signals for the plurality of switching elements (not shown) of the inverters 41, 42 and so on are output from the motor ECU 40 via the output port. The motor ECU 40 is connected to the HVECU 70 via the communication port. The motor ECU 40 calculates rotational speeds Nm1, Nm2 of the motors MG1, MG2 based on the rotational positions $\theta m1$, $\theta m2$ of the rotors of the motors MG1, MG2 from the rotational position detection sensors 43, 44.

The battery 50 is configured as, for example, a lithium-ion secondary battery or a nickel-hydrogen secondary battery. As described above, the battery 50 is connected to the inverters 41, 42 via the electric power line 54. The battery 50 is managed by a battery electronic control unit (hereinafter referred to as a "battery ECU") 52.

Although not shown, the battery ECU 52 is configured as a microprocessor including a CPU as its main component and, in addition to the CPU, includes a ROM that stores processing programs, a RAM that temporarily stores data; a flash memory, input and output ports, and a communication port. Signals from various sensors that are necessary for managing the battery 50, such as, for example, a battery voltage Vb from a voltage sensor 51a disposed between terminals of the battery 50 and a battery current Ib from a current sensor 51b attached to the output terminal of the battery 50, are input to the battery ECU 52 via the input port. The battery ECU 52 is connected to the HVECU 70 via the communication port. The battery ECU 52 calculates a state of charge SOC based on an integrated value of the battery current Ib from the current sensor 51b. The state of charge SOC is a ratio of the capacity of electric power, which can be discharged from the battery 50, to the full capacity of the battery 50.

The charger 60 is connected to the electric power line 54 and configured such that when a power plug 61 is connected to an external power source 69 such as a household power source or an industrial power source at a battery charging point such as at home or in a battery charging station, it is possible to carry out external charging that charges the battery 50 using electric power from the external power source 69.

The navigation device 90 includes a body incorporating a control unit having a storage medium such as a hard disk that stores map information and so on, input and output ports, a communication port, and so on, a GPS antenna that receives information on the current position of the vehicle, and a touch-panel display that displays various information such as information on the current position of the vehicle and a travel route to a destination and that allows an operator to input various instructions. Herein, as the map information, service information (e.g., sightseeing information, parking lots, battery charging stations, etc.), road information per travel section determined in advance (e.g., between traffic lights, between intersections, etc.), and so on are stored in a database. The road information includes distance information, width information, area information (urban area, suburban area), type information (general road, expressway), gradient information, legal speed limit, the number of traffic lights, and so on. A parking lot at home and a desired spot can be point-registered as service information. When a destination is set by the operator, the navigation device 90 searches for a travel route from a current position of the vehicle to the destination based on the map information, the current position of the vehicle, and the destination and outputs the retrieved travel route to the display to perform route guidance. The navigation device 90 also calculates route information in the travel route (e.g. a remaining distance Ln to the destination, a direction Du of the destination, etc.). The navigation device 90 is connected to the HVECU 70 via the communication port.

Figure 2:
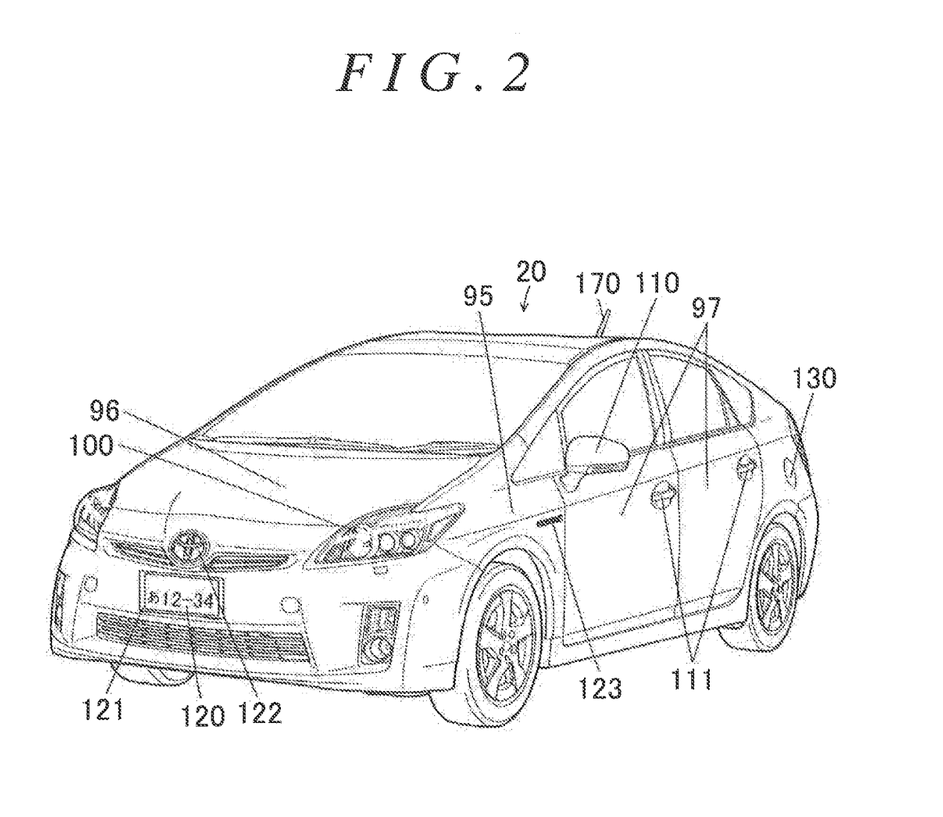
FIG. 2 is an outside drawing illustrating an appearance of the hybrid vehicle.
Figure 3:
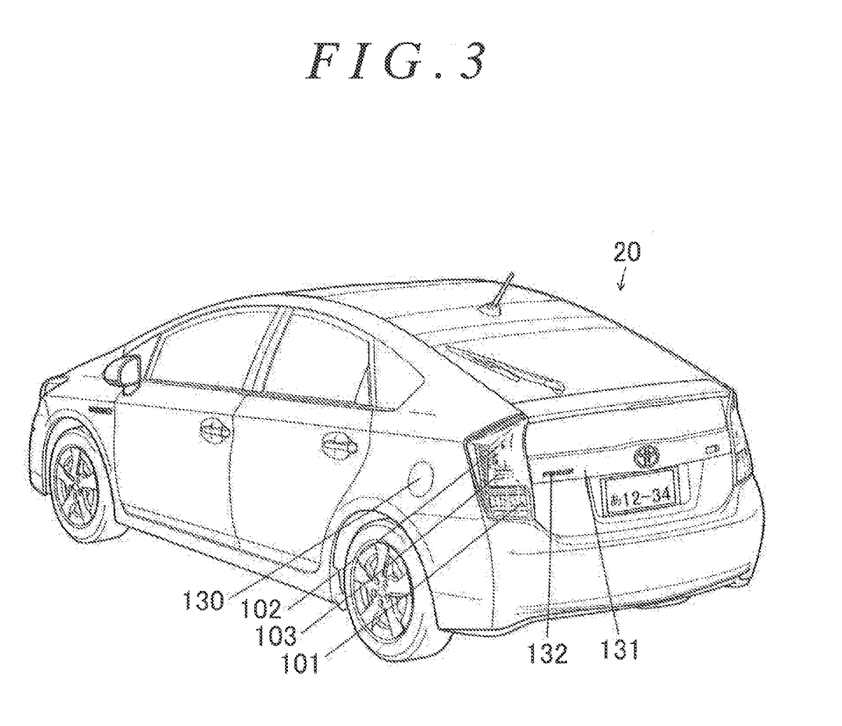
FIG. 3 is an outside drawing illustrating the appearance of the hybrid vehicle.
Figure 4:
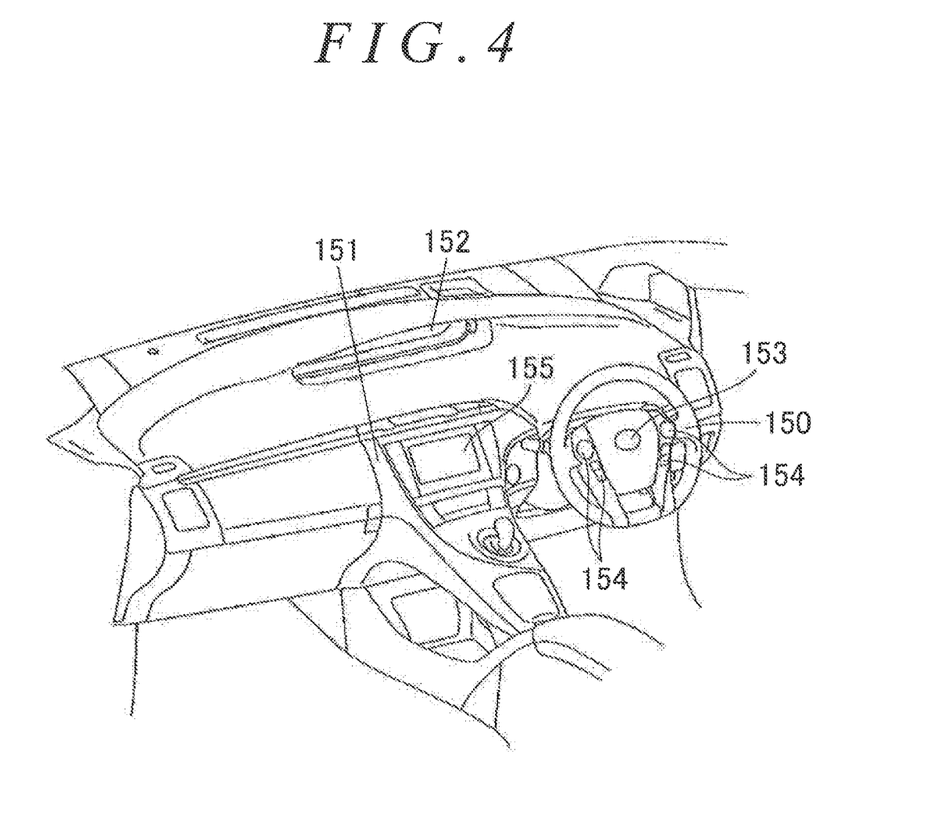
FIG. 4 is a configuration diagram illustrating a state of an inside of the hybrid vehicle.

Although not shown, the HVECU 70 is configured as a microprocessor including a CPU as its main component and, in addition to the CPU, includes a ROM that stores processing programs, a RAM that temporarily stores data, a flash memory 72, input and output ports, and a communication port. Signals from various sensors are input to the HVECU 70 via the input port. As the signals that are input to the HVECU 70, there can be cited, for example, an ignition signal from an ignition switch 80, a shift position SP from a shift position sensor 82, an accelerator opening degree Acc from an accelerator pedal position sensor 84, a brake pedal position BP from a brake pedal position sensor 86, a vehicle speed V from a vehicle speed sensor 88; and the like signals. There can further be cited a fuel quantity Qf from a fuel gauge 23a attached to the fuel tank 25, a connection signal SWC from a connection switch 62 that is attached to the power plug 61 and determines whether or not the power plug 61 is connected to the external power source 69, and so on. Various control signals are output from the HVECU 70 via the output port. As the signals that are output from the HVECU 70, there can be cited a control signal to the charger 60, and so on. Further, as illustrated in FIGS. 2 and 3, there can be cited display control signals to a vehicle body 93, a bonnet 96, a door 97, a head lamp 100, a back lamp 101, a stop lamp 102, a turn signal lamp 103, an outer rear view mirror assembly 110, an exterior door handle assembly 111, a number plate 120, a number frame 121, a mark emblem 122, a letter emblem 123, a charging inlet lid 130, a refueling lid (not shown), a back door garnish assembly 131, and a hack door nameplate 132, a shape change control signal to an antenna 170, and the like signals. Further, as illustrated in FIG. 4, there can be also cited display control signals to a steering wheel 130, an instrument panel 151, and a combination meter 152, a control signal to an inner rearview mirror assembly (not shown), and the like signals. As described above, the HVECU 70 is connected to the engine ECU 24, the motor ECU 40, the battery ECU 52, and the navigation device 90 via the communication port. When the fuel tank 25 is refueled, the HVECU 70 calculates a refueled quantity based on a fuel quantity Qf from the fuel gauge 25a.

The hybrid vehicle 20 of the embodiment configured as described above performs hybrid travel (HV travel) or electric travel (EV travel) in a Charge Depleting (CD) mode or a Charge Sustaining (CS) mode. Herein, the CD mode is a mode that gives priority to the EV travel as compared to the CS mode. The HV travel is a mode of traveling with the operation of the engine 22. The EV travel is a mode of traveling without the operation of the engine 22.

In the embodiment, when the power plug 61 is connected to the external power source 69 while the vehicle is stopped with the system off (with the system stopped) at a battery charging point such as at home or in a battery charging station, the HVECU 70 controls the charger 60 to charge the battery 50 using electric power from the external power source 69. When the state of charge SOC of the battery 50 is greater than a threshold value Shv1 (e.g., 45%, 50%, or 55%) upon turning on the system (upon starting the system), the vehicle travels in the CD mode until the state of charge SOC of the battery 50 reaches a threshold value Shv2 (e.g., 25%, 30%, or 35%) or less, while, after the state of charge SOC of the battery 50 reaches the threshold value Shv2 or less, the vehicle travels in the CS mode until the system is turned off. On the other hand, when the state of charge SOC of the battery 50 is less than or equal to the threshold value Shv1 upon turning on the system, the vehicle travels in the CS mode until the system is turned off.

Figure 5:
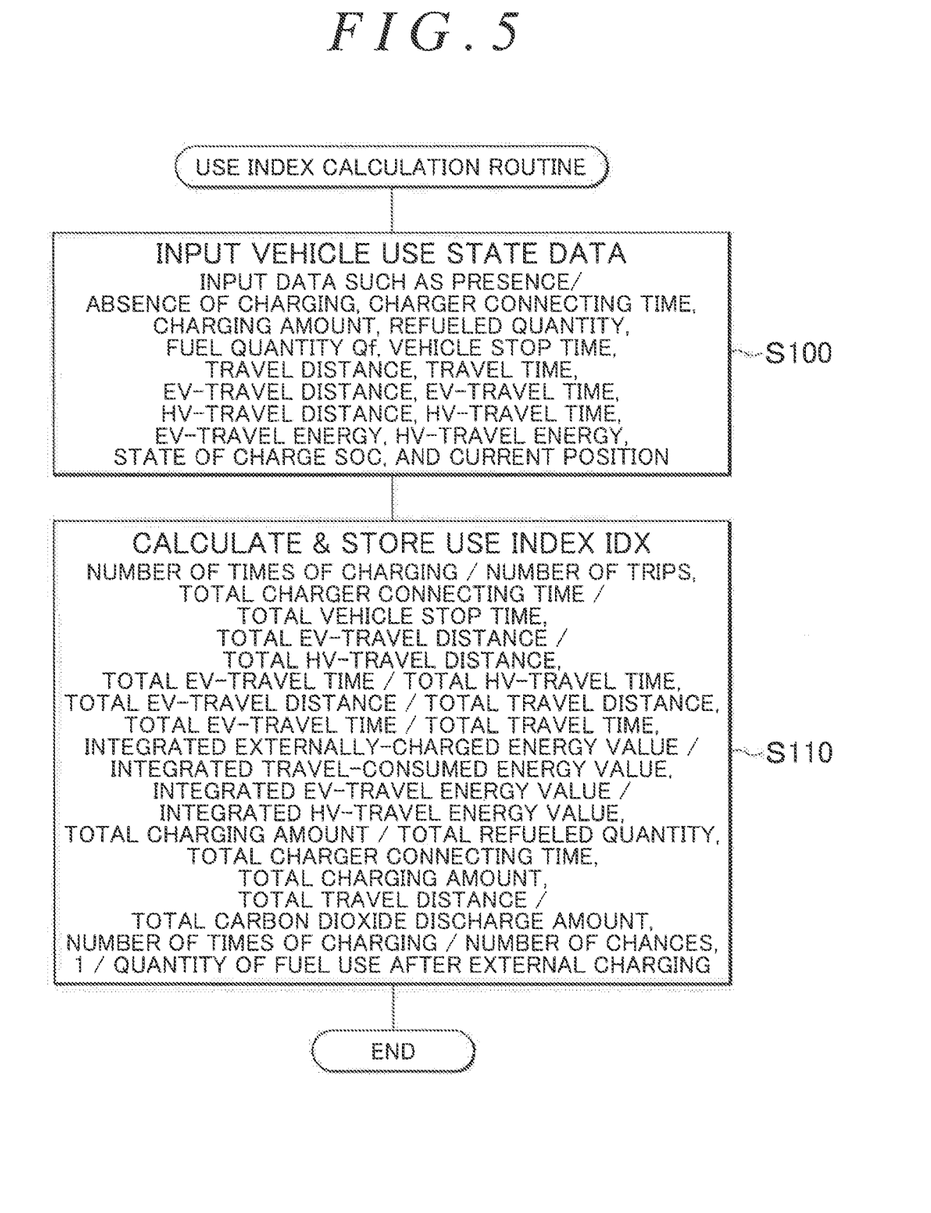
FIG. 5 is a flowchart illustrating an example of a use index calculation routine that is executed by an HVECU.
Figure 6:
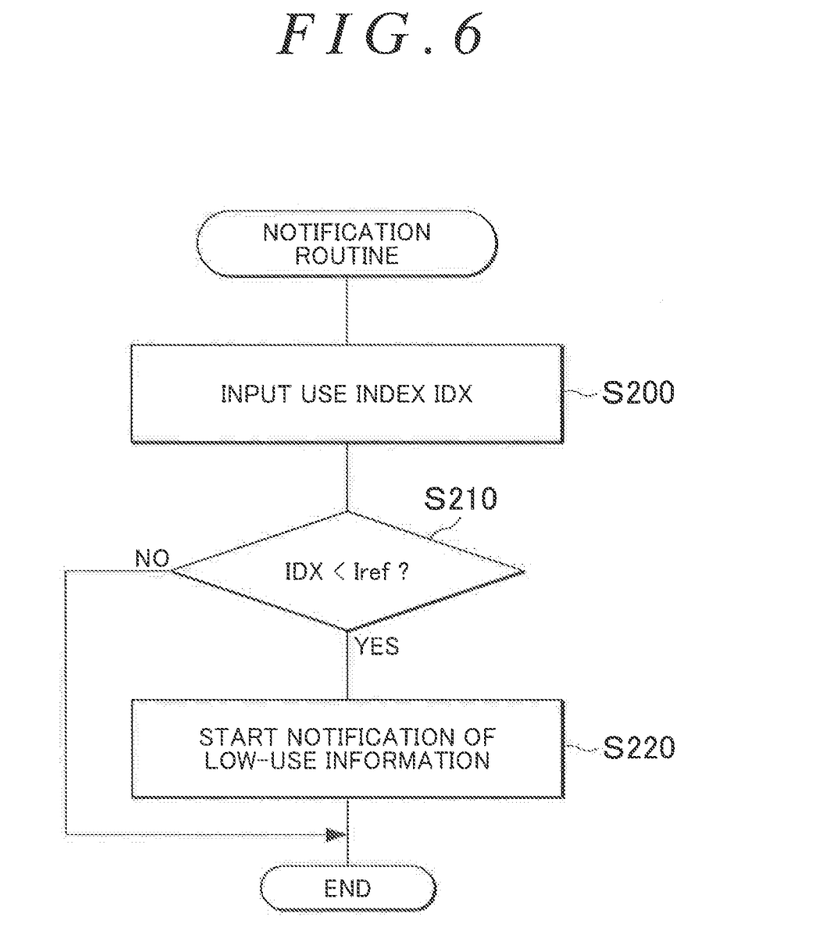
FIG. 6 is a flowchart illustrating an example of a notification routine that is executed by the HVECU.

Next, a description will be given of the operation of the hybrid vehicle 20 of the embodiment thus configured, particularly the operation of the hybrid vehicle 20 when a use index IDX indicating a degree of use of charging (external charging) of the battery 50 by the charger 60 is small, i.e. when the degree of use of external charging is low. FIG. 5 is a flowchart illustrating an example of a use index calculation routine that is executed by the HVECU 70. FIG. 6 is a flowchart illustrating an example of a notification routine that is executed by the HVECU 70. Hereinbelow, these routines will be described in order.

First described is the use index calculation routine of FIG. 5. The routine is executed at a predetermined start timing, such as when the system is turned on (the system is started), when the system is turned off (the system is stopped), when charging of the battery 50 is completed by connecting the power plug 61 to the external power source 69, or when the fuel tank 25 is refueled. Hereinbelow, a description will be given assuming that this routine is executed when the system is turned on (the system is started).

When the use index calculation routine is executed, the HVECU 70 first performs a process of inputting data that reflect vehicle use states and are necessary for calculating a use index IDX in a predetermined time period (step S100). Here, as the "predetermined time period," it is possible to use a predetermined time period set in advance in terms of time, such as one month or two months, a period determined in advance in terms of occasion, such as a period during 20 trips or a period during 30 trips, or the like. As "data that reflect vehicle use states", there can be cited, as data from the system-off timing of the last trip to the system-on timing of the current trip, the presence/absence of charging of the battery 50 by the charger 60 (the presence/absence of external charging), a charging time (a charger connecting time) for which the power plug 61 of the charger 60 is connected to the external power source 69, and a charging amount of the battery 50 by the charger 60. There can also be cited a refueled quantity, a fuel quantity Qf, a vehicle stop time from the system-off timing of the last trip to the system-on timing of the current trip, a travel distance in the last trip, and a travel time in the last trip. Further, there can be cited an EV-travel distance in the last trip, an EV-travel time in the last trip, an HV-travel distance in the last trip, and an HV-travel time in the last trip. Further, there can be cited an energy (an EV-travel energy) consumed by EV travel in the last trip, an energy (an HV-travel energy) consumed by HV travel in the last trip, a state of charge SOC, a current position of the vehicle, and so on.

After the data necessary for calculating the use index IDX are input as described above, the HVECU 70 calculates a use index IDX using the input data and stores the calculated use index IDX in the RAM (not shown) and the flash memory 72 of the HVECU 70 (step S110), and ends this routine. In the embodiment, the use index IDX is calculated as one of (1) to (14) given below or is calculated based on one or a plurality of (1) to (14). The use index IDX is calculated such that the greater the use index IDX, the better the use of charging (external charging) of the battery 50 by the charger 60. (1) Ratio of Number of Times of Charging to Number of Trips (Number of Times of Charging/Number of Trips).

Here, the number of times of charging can be obtained by counting based on the presence/absence of external charging in the predetermined time period. The presence/absence of external charging can be detected by determining whether or not the power plug 61 is connected to the external power source 69 based on a connection signal SWC from the connection switch 62, or by determining an increase in the state of charge SOC of the battery 50. The number of trips can be obtained by counting every time the system is turned on in the predetermined time period.

(2) Ratio of Total Time for which Charger 60 is connected to External Power Source 69 to Total Time for which Vehicle is stopped with System off (Total Charger Connecting Time/Total Vehicle Stop Time). Here, the total charger connecting time can be obtained by integrating the charging time for which the power plug 61 of the charger 60 is connected to the external power source 69 in the predetermined time period. The total vehicle stop time can be obtained by integrating the vehicle stop time between the trips in the predetermined time period.

(3) Ratio of Total Distance of EV Travel to Total Distance of HV Travel (Total EV-Travel Distance Total HV-Travel Distance). Here, the total EV-travel distance can be obtained by integrating the EV-travel distances in the trips in the predetermined time period. The total HV-travel distance can be obtained by integrating the HV-travel distances in the trips in the predetermined time period.

(4) Ratio of Total Time of EV Travel to Total Time of HV Travel (Total EV-Travel Time/Total HV-Travel Time). Here, the total EV-travel time can be obtained by integrating the EV-travel time in the trips in the predetermined time period. The total HV-travel time can be obtained by integrating the HV-travel time in the trips in the predetermined time period.

(5) Ratio of Total Distance of EV Travel to Total Travel Distance (Total EV-Travel Distance/Total Travel Distance). Here, the total travel distance can be obtained by integrating the travel distances in the trips in the predetermined time period.

(6) Ratio of Total Time of EV Travel to Total Travel Time (Total EV-Travel Time/Total Travel Time). Here, the total travel time can be obtained by integrating the travel time in the trips in the predetermined time period.

(7) Ratio of Total Charging Amount of Charging of Battery 50 by Charger 60 to Total Refueled Quantity to Fuel Tank 25 (Total Charging Amount/Total Refueled Quantity). Here, the total charging amount can be obtained by integrating the charging amounts by external charging in the predetermined time period. The total refueled quantity can be obtained by integrating the refueled quantities in the predetermined time period.

(8) Ratio of Integrated Value of Energy charged to Battery 50 by Electric Power from External Power Source 69 to Integrated Value of Energy consumed by Travel (Integrated Externally-Charged Energy Value/Integrated Travel-Consumed Energy Value). Here, the integrated externally-charged energy value can be obtained by integrating the charging amounts by external charging in the predetermined time period. The integrated travel-consumed energy value can be obtained as an integrated value of EV-travel energy and HV-travel energy. The EV-travel energy or the HV-travel energy can be obtained by time-integrating the product of a vehicle weight M and a vehicle speed V ($\int M \cdot V dt$) during EV travel or HV travel. As the vehicle weight M, it is possible to use a value measured by a vehicle weight sensor, a value calculated based on data from a gradient sensor and the torque and acceleration of the motor MG2, or a value determined in advance.

(9) Ratio of Integrated Value of Energy consumed by EV Travel to Integrated Value of Energy consumed by HV travel (Integrated EV-Travel Energy Value/Integrated HV-Travel Energy Value). Here, the integrated EV-travel energy value can be obtained by integrating the EV-travel energy. The integrated HV-travel energy value can be obtained by integrating the HV-travel energy.

(10) Total Time for which Charger 60 is connected to External Power Source 69 (Total Charger Connecting Time). Here, the total charger connecting time can be obtained by integrating the time for which the charger 60 is connected to the external power source 69 in the predetermined time period.

(11) Total Charging Amount of Charging of Battery 50 by Charger 60. Here, the total charging amount can be obtained by integrating the charging amounts by external charging in the predetermined time period.

(12) Ratio of Traveled Total Travel Distance to Total Discharge Amount of Carbon Dioxide (Total Travel Distance/Total Carbon Dioxide Discharge Amount). Here, the total carbon dioxide discharge amount can be calculated as the sum of the product of the total refueled quantity and a fuel coefficient and the product of the total charging amount and an external charging coefficient.

(13) Ratio of, to Number of Charging Chances (Number of Chances) in State where Vehicle can be externally charged, Number of Times of carrying out External Charging in that State (Number of Times of Charging in Chance) (Number of Times of Charging in Chance/Number of Chances). Here, the number of chances can be obtained by counting the number of times in which the vehicle was parked in a parking lot at home or in a battery charging station in the predetermined time period. Whether or not the vehicle is parked in the parking lot at home or in the battery charging station can be determined by determining whether or not the current position of the vehicle from the navigation device 90 is the parking lot at home or the battery charging station. The number of times of charging can be obtained by counting the number of times in which the vehicle was parked in the parking lot at home or in the battery charging station and charged in the predetermined time period.

(14) Inverse Number of Quantity of Fuel Use by Internal Combustion Engine after External Charging (1/Quantity of Fuel Use after External Charging). Here, the quantity of fuel use after external charging can be calculated based on a fuel quantity Qf when the external charging was carried out, a refueled quantity, and a current fuel quantity Qf.

Next, the notification routine of FIG. 6 will be described. The routine is executed at a predetermined timing, such as when the system is turned on (in a case where the use index calculation routine of FIG. 5 is executed when the system is turned on (the system is started), the routine is executed after that), or when the system is turned off (the system is stopped).

When the notification routine is executed, the HVECU 70 inputs the use index IDX (step S200) and compares the use index IDX thus input with a threshold Iref (step S210). Here, the threshold value Iref is determined in advance as a threshold value for determining that the degree of use of external charging is low (the use of external charging is not performed preferably).

When the use index IDX is the threshold Iref or more, it is determined that the degree of use of external charging is not low, and this routine is finished. In the meantime, when the use index IDX is less than the threshold Iref, it is determined that the degree of use of external charging is low, and a process of notifying low-use information indicative of that to an outside of the vehicle is started (step S220). Here, the routine is finished. The process of notifying the low-use information to the outside of the vehicle can be executed until the system-off timing (during a trip), or can be executed for a predetermined time from the system-off timing.

In the embodiment, as the process of notifying the low-use information to the outside of the vehicle, one or more of the following changes are performed: change of color (temperature color) of the head lamp 100 at the time when the use index IDX is the threshold Iref or more (in a normal time); change of color of the back lamp 101; change of color of the stop lamp 102; change of color of the turn signal lamp 103; change of color of a mirror cover of the outer rear view mirror assembly 110; change of color of the exterior door handle assembly 111; change of color of a letter of the number plate 120; change of color of the number frame 121; change of color of the mark emblem 122; change of color of the letter emblem 123; change of color of the charging inlet lid 130; change of color of the refueling lid (not shown); change of color of the hack door garnish assembly 131; change of color of a letter of the back door name plate 132; and the like. Note that it is preferable that the change of color of each part of the vehicle be performed within a range determined by laws and the like.

As the change of color (color temperature) of the head lamp 100, it is conceivable, for example, that when the use index IDX is the threshold Iref or more, the color is changed to white (high temperature), and when the use index IDX is less than the threshold Iref, the color is changed to lemon yellow (low temperature). As the change of color of the outer rear view mirror assembly 110, the exterior door handle assembly 111, and the like, it is conceivable, for example, that: in a case where the use index IDX is the threshold Iref or more, the color is changed to the same color as the vehicle body 95; and in a case where the use index IDX is less than the threshold Iref, when the use index IDX is not less than a threshold Iref2, which is smaller than the threshold Iref, the color is changed to yellow, and when the use index IDX is less than the threshold Iref2, the color is changed to a warning color such as red.

Thus, when the use index IDX is small, that is, when the degree of use of external charging is low, the process of notifying the low-use information to the outside of the vehicle is performed. This makes it possible to recognize (visually) from the outside of the vehicle that the degree of use of external charging is low. Hereby, by the recognition from the outside of the vehicle (recognition by people outside the vehicle, a vehicle external system, or the like), a preferential treatment can be easily performed on the vehicle or a penalty can be easily imposed on the vehicle. As a result, it is possible to urge a user to use the external charging, thereby making it possible to promote the use of external charging. Note that, as the preferential treatment and the penalty, there can be cited permission of use of a priority lane or a special-purpose lane on a road including plurality of lanes, setting of a high toll or a low toll in a toll road, permission of entry to a parking lot or the like, permission of use of a priority parking space or a special-purpose parking space in a parking lot, setting of a high external-charging fee or a low external-charging fee at a battery charging station, and so on.

In the hybrid vehicle 20 of the embodiment described above, when the use index IDX indicative of the degree of use of external charging is less than the threshold Iref, the color of each part of the vehicle, such as the head lamp 100, is changed from the color set when the use index IDX is the threshold Iref or more (in the normal time), as the process of notifying the low-use information to the outside of the vehicle. Hereby, by the recognition from the outside of the vehicle, a preferential treatment can be easily performed on the vehicle or a penalty can be easily imposed on the vehicle. As a result, it is possible to urge the user to use the external charging, thereby making it possible to promote the use of external charging. This makes it possible to achieve a reduction in environment load.

In the hybrid vehicle 20 of the embodiment, when the use index IDX is less than the threshold Iref, the color of each part of the vehicle, such as the head lamp 100, is changed from the color set when the use index IDX is the threshold Iref or more (in the normal time). In substitution or addition to this, one or more of the following may be performed: display of the use index IDX; display of the message; change of shape of the vehicle; and lighting of an identification lamp (not shown) in a case where the identification lamp is provided. Note that it is also preferable that these operations be performed within a range determined by laws and the like, similarly to the embodiment.

Figure 7:
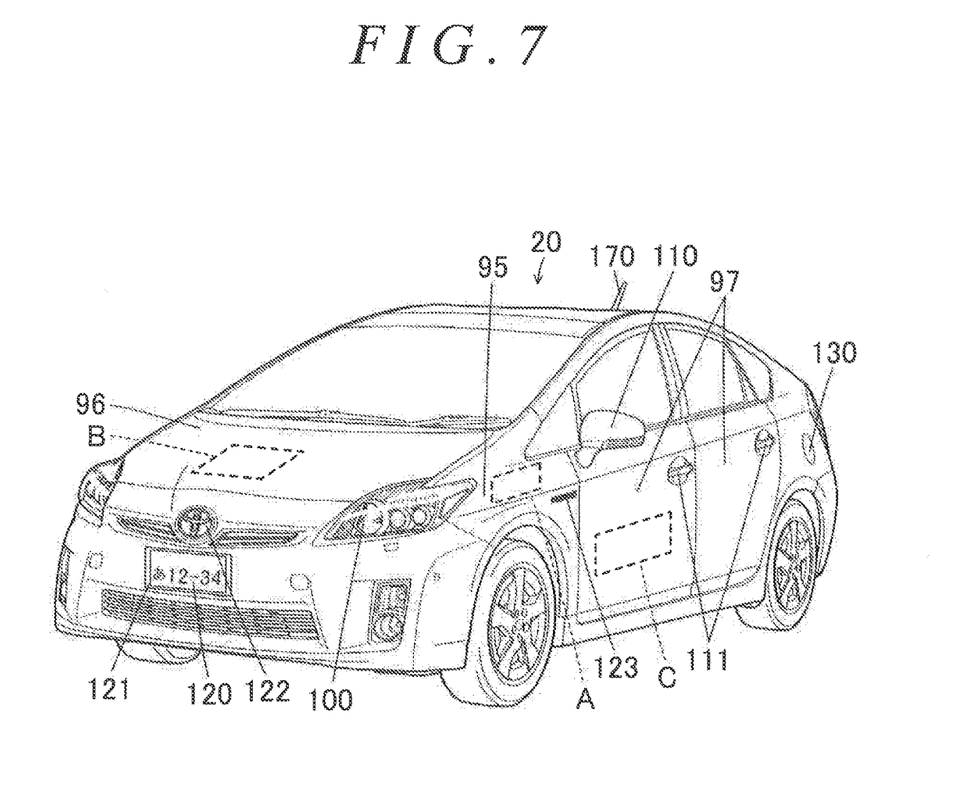
FIG. 7 is an explanatory view illustrating a part that displays the use index IDX of the hybrid vehicle or a message indicating that the use index IDX is low.
Figure 8:
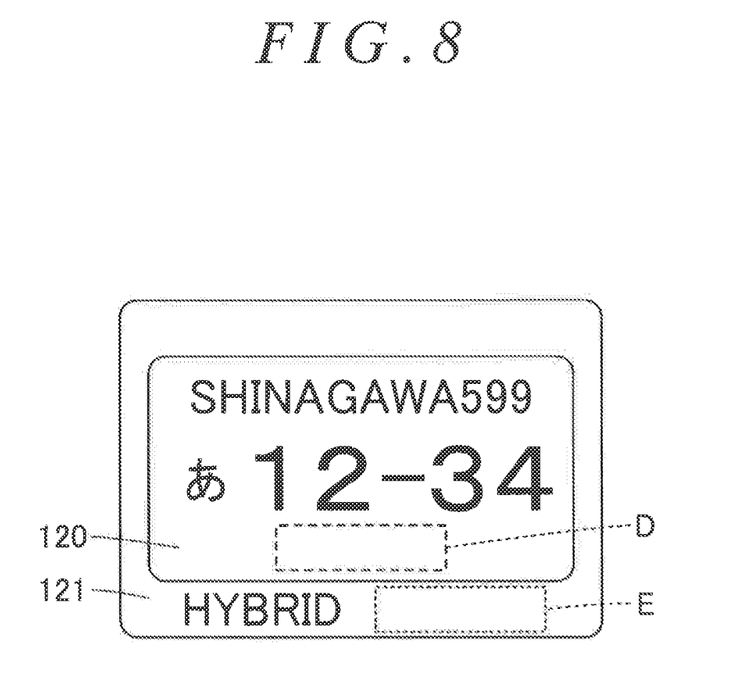
FIG. 8 is an explanatory view illustrating a part that displays the use index IDX of the hybrid vehicle or a message indicating that the use index IDX is low.

In a case where the use index IDX is displayed, it is conceivable, for example, that the use index IDX is displayed in the form of a decimal number or a percentage on the vehicle body 95 (e.g., a part A surrounded by a broken line in FIG. 7), the bonnet 96 (e.g., a part B surrounded by a broken line in FIG. 7), the door 97 (e.g., a part C surrounded by a broken line in FIG. 7), the number plate 120 (e.g., a part D surrounded by a broken line in FIG. 8), the number frame 121 (e.g., a part E surrounded by a broken line in FIG. 7), and the like. Hereby, due to the display of the use index IDX, it is possible to recognize (visually) from the outside of the vehicle that the degree of use of external charging is low.

In a case where the message corresponding to the use index IDX is displayed, it is conceivable, for example, that a message indicating that the use index IDX is low (e.g., "the external charging is not preferably used," "the external charging is not carried out," and the like) is displayed on the vehicle body 95 (e.g., the part A surrounded by the broken line in FIG. 7), the bonnet 96 (e.g., the part B surrounded by the broken line in FIG. 7), the door 97 (e.g., the part C surrounded by the broken line in FIG. 7), and the like. Hereby, due to the display of the message, it is possible to recognize (visually) from the outside of the vehicle that the degree of use of external charging is low.

In a case where the shape of the vehicle is changed according to the use index IDX, it is conceivable, for example, that a length of a projecting portion of the antenna 170 from the vehicle body 95 is changed. Hereby, due to the length of the projecting portion of the antenna 170 from the vehicle body 95, it is possible to recognize (visually) from the outside of the vehicle that the degree of use of external charging is low.

In the hybrid vehicle 20 of the embodiment, when the use index IDX is less than the threshold Iref, the low-use information indicating that the degree of use of external charging is low is notified to the outside of the vehicle, and when the use index IDX is the threshold Iref or more, the low-use information is not notified to the outside of the vehicle (nothing is performed in particular). However, when the use index IDX is the threshold Iref or more, high-use information indicating that the degree of use of external charging is high may be notified to the outside of the vehicle, and when the use index IDX is less than the threshold Iref, the high-use information is not notified to the outside of the vehicle (nothing is performed in particular). That is, information corresponding to the use index LOX may be notified to the outside of the vehicle (so that information on the use index IDX can be recognized from the outside of the vehicle). Note that the process of notifying the high-use information to the outside of the vehicle can be executed until the system-off timing (during a trip), or can be executed for a predetermined time from the system-off timing.

In the hybrid vehicle 20 of the embodiment or the modification, the process of notifying the low-use information or the high-use information to the outside of the vehicle is executed until the system-off timing (during a trip), or is executed for a predetermined time from the system-off timing. However, the process of notifying the low-use information or the high-use information to the outside of the vehicle may be executed only when the priority lane or the special-purpose lane on the road including the plurality of lanes is used during the trip. Further, the process of notifying the high-use information to the outside of the vehicle may be executed during external charging while the use index IDX is equal to the threshold Iref or not less than the threshold Iref3, which is larger than the threshold Iref. Further, the process of notifying the low-use information or the high-use information may be executed during external charging using, as electric power from the external power source 69, electric power with a relatively large discharge amount of carbon dioxide and with a relatively low electric power cost.

In the hybrid vehicle 20 of the embodiment, when the use index IDX is less than the threshold Iref, information indicating that the degree of use of external charging is low is notified to the outside of the vehicle. However, in addition to this, information indicating that the degree of use of external charging is low may be notified to the inside of the vehicle. At the time when the information indicating that the degree of use of external charging is low is notified to the inside of the vehicle, it is conceivable, for example, to perform one or more of the following: change of color of the steering wheel 150; change of color of the emblem 153 or the switch 151 provided in the steering wheel 150; change of color of the instrument panel 151; display of the use index IDX on the combination meter 152; display of the use index IDX on a display of the navigation device 90; display of the use index IDX on a mirror of the inner rearview mirror assembly (not shown); and the like. With such a configuration, it is possible not only to recognize (visually) from the outside of the vehicle that the degree of use of external charging is low, but also for a driver and other passengers to recognize it.

The hybrid vehicle 20 of the embodiment includes the charger 60 configured to charge the battery 50 by connecting the power plug 61 to the external power source 69, but may include a charger that charges the battery 50 by receiving electric power from the external power source 69 in a non-contact manner.

Figure 9:
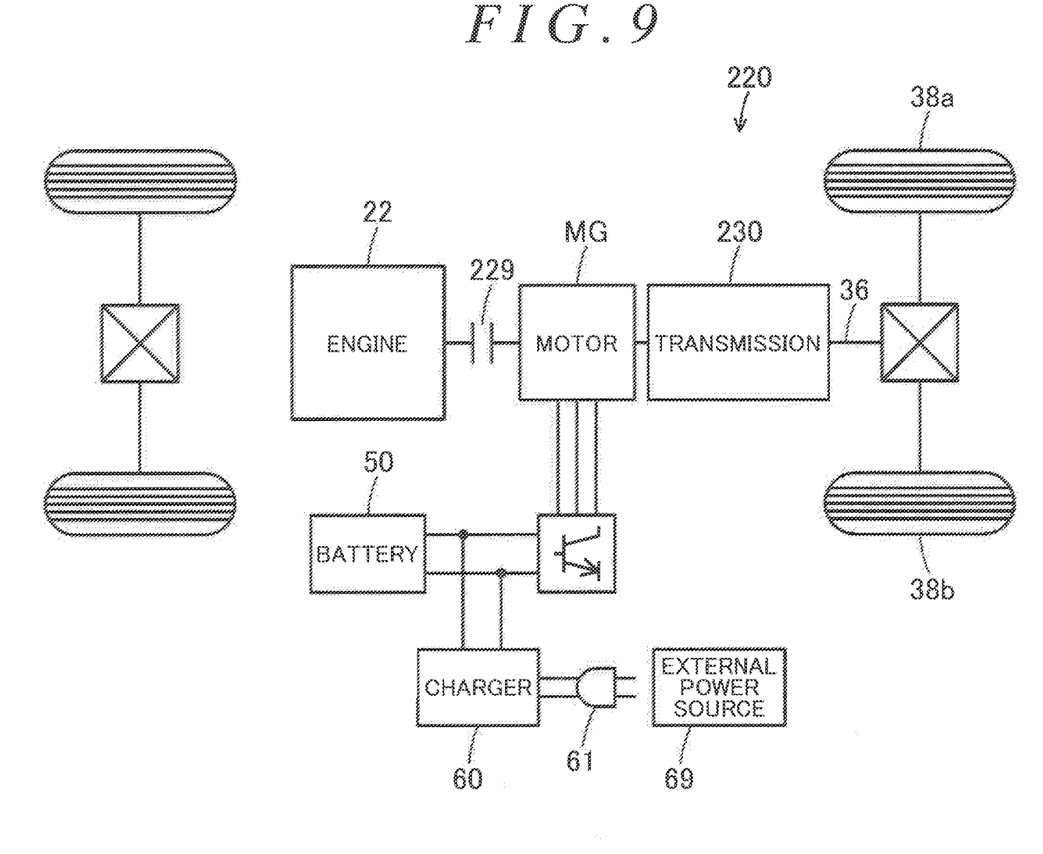
FIG. 9 is a configuration diagram schematically illustrating a configuration of a hybrid vehicle according to a modification.

In the hybrid vehicle 20 of the embodiment, the engine 22, the motor MG1, and the drive shaft 36 are connected to the planetary gear 30, and the motor MG2 is connected to the drive shaft 36. As exemplified in a hybrid vehicle 220 of a modification in FIG. 9, a motor MG may be connected to a drive shaft 36 connected to driving wheels 38*a*, 38*b* via a transmission 230, and an engine 22 may be connected to a rotating shaft of the motor MG via a clutch 229, so that power from the engine 22 is output to the drive shaft 36 via the rotating shaft of the motor MG and the transmission 230, and power from the motor MG is output to the drive shaft via the transmission 230. Further, a configuration of what is called a series hybrid vehicle may be employed. That is, any configuration may be employed, provided that the vehicle is a hybrid vehicle including an engine, a motor, a battery, and a charger that charges the battery by being connected to an external power source.

In the embodiment, the engine 22 is an example of an "engine," the fuel tank 25 is an example of a "fuel tank," the motor MG2 is an example of a "motor," the battery 50 is an example of a "battery," the charger 60 is an example of a "charger," and the HVECU 70 that executes the use index calculation process routine of FIG. 5 and the notification routine of FIG. 6, the head lamp 100, and the like are an example of a "notification mechanism."

Note that the correspondence between the main elements of the embodiment and the main elements of the disclosure as described in the field of Means for Solving Problem are just examples to specifically describe the mode for carrying out the disclosure, described in the field of Means for Solving Problem, so they are not limited to the elements of the disclosure described in the field of Means for Solving Problem. That is, the interpretation of the disclosure described in the field of Means for Solving Problem should be made based on the description of the field, and the embodiment is merely one concrete example of the disclosure.

The configuration to perform the present disclosure has been explained by use of the embodiment, but it is needless to say that the present disclosure is not limited to such an embodiment at all and may be performable in various embodiments as long as the various embodiments are not beyond the gist thereof.

The present disclosure is usable in a manufacture industry of a hybrid vehicle, and the like.

What is claimed is:

1. A hybrid vehicle comprising:
   an engine;
   a fuel tank that stores fuel to be supplied to the engine;
   a motor;
   a battery configured to supply electric power to the motor;
   a charger configured to carry out external charging that charges the battery by use of electric power from an external power source; and
   a notification mechanism configured to notify information on a use index to an outside of the vehicle during a trip while the vehicle is moving, the use index being an index for indicating how often external charging is carried out in a predetermined time period.

2. The hybrid vehicle according to claim 1, wherein
   the notification mechanism is configured to perform notification of the information on the use index by performing at least one of change of color of a part of the hybrid vehicle according to the use index, display of the use index on a part of the hybrid vehicle, display of a message corresponding to the use index on a part of the hybrid vehicle, and change of shape of a part of the hybrid vehicle according to the use index.

3. The hybrid vehicle according to claim 2, wherein
   when the notification mechanism performs the notification of the information on the use index by performing the change of color of the part of the hybrid vehicle according to the use index, the notification mechanism performs the notification by performing at least one of change of color of a head lamp, change of color of a back lamp, change of color of a stop lamp, change of color of a turn signal lamp, change of color of an outer rear view mirror assembly, change of color of an exterior door handle assembly, change of color of a letter of a number plate, change of color of a number frame, change of color of an emblem, change of color of a lid, change of color of a back door garnish assembly and change of color of a letter of a back door name plate.

4. The hybrid vehicle according to claim 2, wherein
   when the notification mechanism performs the notification of the information on the use index by performing the display of the use index on the part of the hybrid vehicle and the display of the message corresponding to the use index on the part of the hybrid vehicle, the notification mechanism is configured to perform the notification by performing at least one of display on a number plate, display on a number frame, display on a vehicle body, display on a bonnet, and display on a door.

5. The hybrid vehicle according to claim 2, wherein
   when the notification mechanism performs the notification of the information on the use index by performing at least one of the display of the use index on the part of the hybrid vehicle and the display of the message corresponding to the use index on the part of the hybrid vehicle, the notification mechanism is configured to perform the notification by performing at least one of display on a number plate, display on a number frame, display on a vehicle body, display on a bonnet, and display on a door.

6. The hybrid vehicle according to claim 2, wherein
   when the notification mechanism performs the notification of the information on the use index by performing the change of shape of the part of the hybrid vehicle according to the use index, the notification mechanism is configured to perform the notification by change of a length of a projecting portion of an antenna from the vehicle body.

7. The hybrid vehicle according to claim 1, wherein
   the notification mechanism is configured to notify the information on the use index to an inside of the vehicle as well as the outside of the vehicle.

8. The hybrid vehicle according to claim 1, wherein
   the notification mechanism is configured to notify the information on the use index when the use index is less than a threshold.

9. The hybrid vehicle according to claim 7, wherein
   when the notification mechanism notifies the information on the use index to the inside of the vehicle, the notification mechanism is configured to perform at least one of change of color of a steering wheel, change of color of the emblem or a switch provided in the steering wheel, change of color of an instrument panel, display of the use index on a combination meter and display of the use index on a display of a navigation device.

10. The hybrid vehicle according to claim 1, further comprising
    an electronic control unit in communication with the notification mechanism, wherein the electronic control unit is configured to calculate the use index and cause the notification mechanism to notify information on the use index to the outside of the vehicle.

* * * * *